United States Patent
Nishimura et al.

(10) Patent No.: US 6,771,438 B2
(45) Date of Patent: Aug. 3, 2004

(54) OPTICAL UNIT AND METHOD FOR ASSEMBLING THE SAME

(75) Inventors: Osamu Nishimura, Ina (JP); Hideto Yamashita, Kamiina-gun (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 10/723,556

(22) Filed: Nov. 24, 2003

(65) Prior Publication Data

US 2004/0105175 A1 Jun. 3, 2004

Related U.S. Application Data

(62) Division of application No. 10/191,133, filed on Jul. 9, 2002, now Pat. No. 6,704,151.

(30) Foreign Application Priority Data

Jul. 10, 2001 (JP) ........................... 2001-209320
Jul. 10, 2001 (JP) ........................... 2001-209321

(51) Int. Cl.$^7$ .................. G02B 7/02; G02B 15/14
(52) U.S. Cl. ........................... 359/819; 359/703
(58) Field of Search ........................ 359/819, 822, 359/694, 703, 704

(56) References Cited

U.S. PATENT DOCUMENTS

| | | | |
|---|---|---|---|
| 4,199,227 A | 4/1980 | Uesugi et al. | |
| 4,472,039 A * | 9/1984 | Iwata et al. | 396/508 |
| 5,557,474 A | 9/1996 | McCrary | |
| 5,612,826 A | 3/1997 | Ohshita | |
| 5,650,879 A | 7/1997 | Emura et al. | |
| 5,798,876 A | 8/1998 | Nagano | |
| 5,926,326 A * | 7/1999 | Fischer et al. | 359/819 |
| 5,969,887 A | 10/1999 | Hagimori et al. | |
| 6,388,825 B1 * | 5/2002 | Koiwai et al. | 359/819 |
| 6,567,224 B2 * | 5/2003 | Hatakeyama et al. | 359/819 |
| 6,590,721 B2 | 7/2003 | Onda | |

FOREIGN PATENT DOCUMENTS

JP 2001-31817 A 11/2001

* cited by examiner

Primary Examiner—Ricky Mack
(74) Attorney, Agent, or Firm—Frishauf, Holtz, Goodman & Chick, P.C.

(57) ABSTRACT

An optical unit includes a lens and a lens frame to support the lens. The lens frame includes a cylindrical portion and a U-shaped portion. The U-shaped portion has a U-shaped cross-section. The cylindrical portion has an edge and an inner surface in contact with an outer surface of the lens. The U-shaped portion is formed integrally with the edge of the cylindrical portion and holds the lens. With the lens held, the U-shaped portion is adhesively bonded to the cylindrical portion and then is removed from the cylindrical portion.

3 Claims, 8 Drawing Sheets

OPTICAL UNIT AND METHOD FOR ASSEMBLING THE SAME

CROSS-REFERENCE TO RELATED APPLICATIONS

The present application is a Divisional Application of U.S. application Ser. No. 10/191,133, filed Jul. 9, 2002 now U.S. Pat. No. 6,704,151 and is based upon and claims benefit of priority from the prior Japanese Patent Applications No. 2001-209320, filed Jul. 10, 2001; and No. 2001-209321, filed Jul. 10, 2001, the entire contents of both of which are incorporated herein by reference.

BACKGROUND OF THE INVENTION

1. Field of the Invention

The present invention relates to an optical unit including a high-precision objective unit having a lens, a lens frame, and a lens barrel and a method of assembling the optical unit.

Further, the present invention relates to an optical unit having a lens-holding apparatus suitable for a high-precision objective lens, etc.

2. Description of the Related Art

Conventionally, as shown in FIG. 7, a microscope objective unit includes a plurality of lenses 103a through 103f, a plurality of lens frames 102a through 102d for holding the lenses 103a through 103f, and a lens barrel 101.

The lens frames 102a through 102d have substantially the same outside diameter. The lens frames 102a through 102d hold lenses 103a through 103f. The lens frames 102a through 102d have center axes for the outside diameters. The center axes of the lens frames 102a through 102d substantially correspond to optical axes of the lenses 103a through 103f.

The lens frames 102a through 102d have center axes for the outside diameters. The center axes of the lens frames 102a through 102d substantially correspond to optical axes of the lenses 103a through 103f.

The lens barrel 101 has the center axis. The lens barrel 101 is cylindrical and has a hole 101a along the center axis. The hole 101a has an inside diameter substantially the same as the outside diameter of the lens frames 102a through 102d.

The lens frames 102a through 102d holding the lenses 103a through 103f are inserted into the hole 101a. The center axes of the lens frames substantially correspond to the center axis of the lens barrel 101. Consequently, optical axes of the lenses 103a through 103f substantially correspond to each other in the hole 101a.

The objective unit is assembled by inserting the lens frames holding the lenses into the lens barrel. This assembling method can provide centering more accurately than a method of assembling the objective unit by directly dropping the sets of lenses 103a through 103f into the lens barrel 101.

There is provided a plurality of types of lens frames as means for holding lenses. For example, the holding means is available as a lens frame as shown in FIG. 8. FIG. 8 shows an optical unit including the above-mentioned lens frame. The optical unit has a set of lenses including lenses 103g and 103h. In the set of lenses, optical axes of the lenses 103g and 103h are coaxially arranged. In FIG. 8, the reference numeral 105 represents an optical axis of the set of lenses.

A lens frame 102e has a predetermined outside diameter. The lens frame 102e has a center axis for the outside diameter. The lens frame 102e has a lens frame edge 104 orthogonal to the center axis. The lens frame edge 104 is formed with high precision along a direction orthogonal to the center axis. The lens frame 102e has a stop which extends toward the inside of the frame itself along a direction orthogonal to the center axis. The stop has a retaining surface for seating a lens.

When the lens frame 102e is used to hold lenses, a set of lenses (cemented lens) including the lenses 103g and 103h is dropped onto the retaining surface in the lens frame 102e. The set of lenses is held on the retaining surface of the lens frame 102e. The set of lenses is fixed to the retaining surface with adhesive.

When adhesively bonding the above-mentioned lens set to the lens frame 102e, the lens 103h is first placed on the retaining surface. The lens frame 102e is then moved along the lens frame edge 104. More specifically, the lens frame 102e rotates around its center axis on the lens frame edge 104. The lens 103h is centered with respect to the lens frame 102e by the rotating. The lens frame 103h is then adhesively bonded to the lens frame 102e. Likewise, the lens 103g is arranged on the lens 103h and is centered with respect to the lens frame 102e. The lens 103g is then adhesively bonded to the lens 103h. The lens frame 102e having the retaining surface is often used as a lens holding means for ordinary objective units.

FIG. 9 shows a lens frame 102f as another example of the above-mentioned holding means. The lens frame 102f in FIG. 9 is configured to be capable of plastic deformation. The lens frame 102f is configured to include a lens 103i. The lens frame 102f is caulked at its end to fix the lens 103i. Accordingly, the lens frame 102f can fix the lens 103i without using adhesive. The means for caulking the lens frame 102f has been long used.

FIG. 10 shows a holding means capable of maintaining a clearance along optical axes of two lenses. FIG. 10 also shows an optical unit including the above-mentioned holding means. The optical unit has a set of lenses A comprising a convex lens 31 and a concave lens 32 bonded to each other and a set of lenses B comprising a convex lens 33 and a concave lens 34 bonded to each other.

The holding means in FIG. 10 has a lens frame 144 for holding the set of lenses A and a lens frame 146 for holding the set of lenses B. The holding means further has a clearance ring 145 arranged between the lens frames 144 and 146. The clearance ring separates the lens frames 144 and 146 with a predetermined clearance along center axes of the lens frames 144 and 146. Consequently, the sets of lenses A and B can separate predetermined clearance along the optical axes thereof.

The set of lenses in FIG. 8 including the lenses 103g and 103h is dropped into the lens frame 102e to be seated in the lens frame 102e. Accordingly, the lens frame 102e can be bonded while the set of lenses is centered. The lens frame 102e needs to have a stop because the set of lenses is dropped thereinto. The space for providing the stop is needed around the lens frame 102e.

As shown in FIG. 11, however, there is no space around the lens frame 102e for an optical system in which lenses are arranged close to each other. It is difficult for the lens frame 102e to maintain or bond the optical system in FIG. 11.

The lens frame 102f in FIG. 9 holds the lens 103i by caulking as mentioned above. Generally, the lens frame 103f it caulked at a very small portion thereof. Thus this caulking is difficult. When the lens 103i is fixed by caulking, the accuracy of centering depends on the worker's experience and skill. When optical unit are manufactured through the use of caulking, there is a problem of widely varying the quality of the optical unit.

As mentioned above, the holding means in FIG. 10 has a clearance ring 145 in addition to the lens frames 144 and 146. Since the holding means has a plurality of members, the structure is complicated. Accordingly, it is difficult to improve the accuracy of centering for the set of lenses A and B. Since the holding means has the complicated structure, a clearance between the set of lenses may not be provided highly precisely.

As shown in FIG. 12, there is devised a holding means having a simplified structure. The simplified structure is provided by integrating the lens frame 144 and the clearance ring 145 in FIG. 10. In FIG. 12, the reference numeral 148 represents a lens frame formed by integrating the lens frame 144 and the clearance ring 145. The use of the lens frame 148 simplifies the optical unit configuration. However, the lens frame 148 has a larger dimension in the direction along its center axis than that of the lens frame 144. Accordingly, the set of lenses A is arranged at an inner part in the direction along the center axis of the lens frame 148. The lens frame 148 makes it difficult to center the set of lenses A.

Especially, a microscope objective unit using wavelengths in an ultraviolet range uses more lenses than a microscope objective unit using wavelengths in a visible range for the following reason.

An ordinary glass does not transmit the light having a wavelength of 300 nm or less. Accordingly, lenses for the ultraviolet range have a limitation on the use of a glass material such as fluorite or quartz which can transmit a wavelength of 300 nm or less.

Therefore, an objective unit for the ultraviolet range is disadvantageous with respect to the correction of chromatic aberration.

In order to conduct the correction of chromatic aberration, it is necessary to arrange objective unit lenses adjacently to each other. One method of arranging the objective unit lenses adjacently to each other is to use an adhesive to bond these lenses to each other. It should be noted that the ultraviolet light degrades the adhesive. Since the transmittance of the bonded lenses decreases, it is undesirable to use an adhesive.

For the correction of chromatic aberration, it is therefore preferable that the lenses are separated from each other with a predetermined interval. Widening an interval between lenses decreases the effect of the correction of chromatic aberration. It is desirable to adjacently arrange convex and concave lenses having different medium.

For the reason as mentioned above, the lenses are very closely arranged in the microscope objective lens unit using wavelengths in the ultraviolet range as shown in FIG. 11. In surfaces of the lenses facing to each other in FIG. 11, curvature radius Rp of the convex lens approximately equals curvature radius Rn of the concave lens. In order to provide substantially the same curvature radius, Rp/Rn must be set to satisfy the following condition.

(Condition) $0.58 < Rp/Rn < 1.65$

When the curvature radius of each facing surface satisfies this condition, the objective unit comprising the above-mentioned lenses can appropriately correct aberrations including the chromatic aberration. When the above-mentioned Rp/Rn is exceeded from $0.58 < Rp/Rn < 1.65$, the correction of chromatic aberration, in particular, becomes difficult.

When there are many lenses close to each other, holding the lenses is difficult for the conventional holding means as shown in FIG. 8. The surface shape of the lens is very accurately in the microscope objective unit using wavelengths in a deep ultraviolet range. Accordingly, holding the lenses is difficult for the holding means as shown in FIG. 9. The microscope objective unit requires high precision for a clearance between lenses. It is also difficult to use the holding means as shown in FIG. 10. These points represent a first problem.

In consideration of the first problem, it would be desirable to provide an optical unit which has a lens frame capable of holding the set of closely arranged lenses and is capable of improve the accuracy of centering and appropriately maintaining the arrangement of the set of lenses with respect to the lens frame, that is the positional relationship between the set of lenses and the lens frame.

Further, it would be desirable to provide assembling an optical unit which has a lens frame capable of holding a set of closely arranged lenses and is capable of improve the accuracy of centering and appropriately maintaining the arrangement of the set of lenses with respect to the lens frame, that is the positional relationship between the set of lenses and the lens frame.

Generally, when lenses are directly fixed in a lens barrel, the optical unit makes it difficult to arrangement the lenses precisely to the barrel. For this reason, the optical unit uses a lens-holding apparatus for holding lenses. The lens-holding apparatus holds the lenses via a lens frame as shown in FIG. 18. For example, the lens-holding apparatus is used to highly accurately hold set of lenses such as an objective unit. FIG. 18 shows an ordinary lens-holding apparatus.

The optical unit such as an objective unit of a microscope has a plurality of lenses. For example, the optical unit in FIG. 18 has three lenses 1101, 1102, and 1103. In this optical unit, errors on decetering or decentration for the lenses 1101, 1102, and 1103 greatly affect the optical characteristics. Accordingly, the lenses 1101, 1102, and 1103 are assembled so as to improve accuracy of optical centers of lens frames 1111, 1112, and 1113 for holding the respective lenses. As a result, the optical center of each lens can maintain a predetermined accuracy with reference to a lens barrel 1120. This can provide Optical unit (objective unit) comprising the lens-holding apparatus with intended optical characteristics.

The above-mentioned conventional lens-holding apparatus has the following problem. If there is a small clearance C between lenses along the optical axis in FIG. 18, the lenses interfere with each other during assembly. Further, for example, FIG. 19 shows a structure in which a lens clearance is small not only in a direction along the optical axis, but also in a direction crossing the optical axis. Such structure increases the risk of interference between lenses. FIG. 19 shows that the lenses 1102 and 1103 having substantially the same radius of curvature are arranged apart from each other with clearance C in the thrust direction along the optical axis. Clearance B is a minimum gap between the lenses 1102 and 1103 along the perpendicular direction (radial direction) of the optical axis.

Generally, during a manufacturing process of the optical unit, a lens frame 1112 holding a lens 1102 is slightly but frequently moved in the radial direction (indicated by an arrow in FIG. 20) against a lens frame 1113 holding a lens 1103. In FIG. 20, lenses 1102 and 1103 are coaxially arranged. When the lens frame 1112 is located with a predetermined decentration. (indicated by X in FIG. 21) with respect to the lens frame 1113, the lenses interfere with each other at an interference portion (indicated by a broken line in FIG. 21). This interference of lenses 1102 and 1103 flaws the lens surface of lenses 1102 and 1103 unlike contact of metallic lens frames with each other. The flawed lens may cause a defect in the performance and the appearance. Especially, a convex lens such as the lens 1103 is often formed of relatively soft glass material such as CaF2 (fluorite) according to the optical design. Such the convex lens is flawed by a small amount of the interference easily.

The flawed lens is defective. Even though the lens does not become defective, special care must be taken to handle such lens during the manufacturing process. Consequently, the productivity of such optical unit is degraded. These points constitute a second problem.

In consideration of the above-mentioned second problem in the prior art, it would be desirable to provide an optical unit including a lens-holding apparatus which prevents the lenses from being damaged by interference of the lenses and is easily handled in the manufacturing process.

BRIEF SUMMARY OF THE INVENTION

An optical unit according to a first aspect of the invention comprises at least one lens having an outer surface; at least one lens frame to hold the lens. The lens frame includes a cylindrical portion having an edge and an inner surface to contact the outer surface of the lens; and a U-shaped portion to hold the lens. The U-shaped portion has a U-shaped cross-section, and is formed integrally with the cylindrical portion at the edge thereof; so that the lens held by the U-shaped portion is adhesively bonded to the cylindrical portion and then the U-shaped portion is removed from the cylindrical portion.

A method of assembling an optical unit according to another aspect of the invention is assembling the optical unit. The optical unit comprises a lens, a cylindrical lens frame, and a cylindrical lens barrel. The lens includes an outside diameter, an outer periphery having a center axis, and an optical axis coaxially arranged to the center axis. The cylindrical lens frame holds the lens. The frame includes an outside diameter, an outer periphery having a center axis, a cylindrical portion and a center axis. The cylindrical portion has a center axis and substantially the same inside diameter as the outside diameter of the lens. The center axis 6f the frame coaxially arranged to the center axis of the outer periphery of the cylindrical portion. The cylindrical lens barrel includes a barrel hole having substantially the same an inside diameter as the outside diameter of the lens frame, the barrel hole having a lens-holding surface with which the frame is to be contact. The cylindrical portion has one opening end and the other opening end along the center axis. The cylindrical portion has a U-shaped portion. The U-shaped portion has a U-shaped cross-section and a lens-retaining surface for positioning the lens along the optical axis. The optical unit assembling method comprises removing the U-shaped portion from the cylindrical portion after adhesively bonding the lens to the cylindrical portion, and fixing the lens frame to the lens-holding surface after removing the U-shaped portion from the cylindrical portion.

A method of assembling an optical unit according to yet another aspect of the invention mounts a lens frame to hold a lens in a lens barrel. The lens has optical axis. The lens frame has a lens-holding surface for holding an outer surface of a lens. The assembling method comprises forming a U-shaped portion to the lens frame. The U-shaped portion has a U-shaped cross-section and a lens-retaining surface for positioning the lens along the optical axis.

In addition, the assembling method comprises bonding the lens on the lens frame by adhesive, removing the U-shaped portion from the lens frame, and mounting the lens frame in the lens barrel.

An optical unit according to still another aspect of the invention comprises a plurality of lenses, each of the lenses having a lens surface and an optical axis, and a lens-holding apparatus. The lens-holding apparatus includes a plurality of lens frames holding at least one lens respectively, and a lens barrel. The lens frames have portions overlapping with each other in a radial direction orthogonal to the optical axis when the lens frames are arranged adjacent each other along the optical axis. The lens-holding apparatus is provided with first clearance in the adjacent two lens frames between the overlap portion of one lens frame and the overlap portion of the other lens frame in a radial direction orthogonal to the optical axis. The lens-holding apparatus is provided with second clearance in the radial direction between the lens surfaces of lenses held by the adjacent two lens frames. The first clearance is smaller than the second clearance. The lens frames is arranged in the lens barrel.

An optical unit according to still another aspect of the invention comprises the lenses, and a lens-holding apparatus. The lenses have an outer surface, a lens surface, and an optical axis. The lens-holding apparatus includes a plurality of lens frames and a lens barrel. The lens frames holds at least one lens respectively. The lens frame includes a cylindrical portion and a U-shaped portion. The cylindrical portion has an edge and an inner surface to contact the outer surface of the lens. The U-shaped portion to holds the lens has a U-shaped cross-section, the U-shaped portion being formed integrally with the cylindrical portion at the edge thereof; so that the lens held by the U-shaped portion is adhesively bonded to the cylindrical portion and then the U-shaped portion is removed from the cylindrical portion. In addition, the lens frames have portions overlapping with each other in a direction along the optical axis when the lens frames are arranged adjacent each other along the optical axis. The lens-holding apparatus is provided with first clearance in the adjacent two lens frames between the overlap portion of one lens frame and the overlap portion of the other lens frame in a radial direction orthogonal to the optical axis. The lens-holding apparatus is provided with second clearance in the radial direction between the lens surfaces of lenses held by the adjacent two lens frames. The first clearance is smaller than the second clearance. The lens frames is arranged in the lens barrel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described in further detail with reference to the accompanying drawings.

First Embodiment

Figure 1:
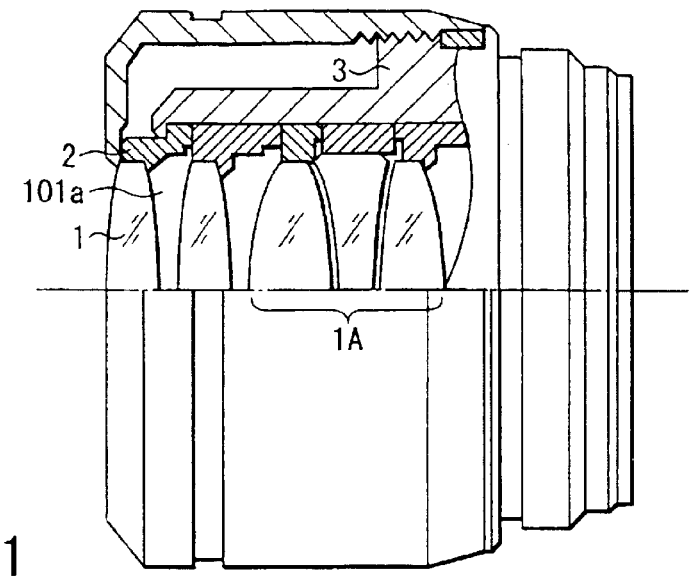
FIG. 1 is a partially side view showing an objective unit according to a first embodiment.
Figure 2:
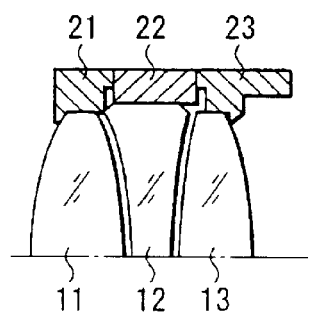
FIG. 2 is a vertical sectional view showing a set of lenses held in a lens frame in FIG. 1.
Figure 3:
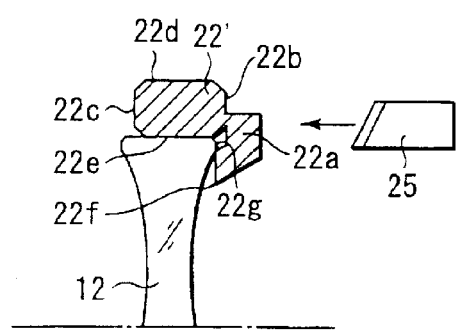
FIG. 3 is a vertical sectional view showing a lens assembly before removing a U-shaped portion according to the first embodiment.

FIGS. 1 through 3 show the first embodiment.

FIG. 1 is a partially side view showing an objective unit according to the first embodiment. FIG. 2 is an enlarged vertical sectional view showing a set of lenses held in a lens frame. FIG. 3 is a vertical sectional view showing a lens assembly before removing a U-shaped portion.

In FIG. 1, the objective unit of a microscope has a plurality of lenses 1, a plurality of lens frames 2 for holding the respective lenses, and a lens barrel 3 for holding the plurality of lens frames 2.

Each lens 1 has an outside diameter and outer periphery. The outer periphery has center axis. Each lens frame 2 is cylindrical and is provided with a cylindrical portion for holding each lens 1. The cylindrical portion has an inside diameter substantially corresponding to the outside diameter of each lens 1. The plurality of lens frames 2 has substantially the same outside diameter. In each lens frame 2, the center axis of the cylindrical portion substantially coaxially arranged to the center axis of an outer periphery thereof.

The lens barrel 3 is cylindrical and is provided with a barrel hole for holding the plurality of lens frames 2. The barrel hole has an inside diameter substantially corresponding to the outside diameter of each lens frame 2.

FIG. 2 shows a set of lenses 1A provided by combining the plurality of lenses 1. More specifically, the set of lenses 1A includes a convex lens 11, a concave lens 12, and a convex lens 13 in the plurality of lenses 1. The set of lenses 1A has a close clearance between the lenses.

As shown in FIG. 2, the lens frames 21, 22, and 23 hold the convex lens 11, the concave lens 12, and the convex lens 13, respectively. The lens frames 21 and 23 are configured like a known lens frame. Specifically, the lens frames 21 and 23 each have a lens frame edge orthogonal to the center axis. The lens frame edge is formed with high precision along a direction orthogonal to the center axis. Each of the lens frames 21 and 23 has a stop which projects toward the inside of the frame. The stop has a retaining surface for seating a lens. The configuration of the lens frame 22 will now be described with reference to FIG. 3.

The following describes a method of mounting lenses in the lens frames 21, 22, and 23. A conventional lens holding means is used for the convex lenses 11 and 13. Specifically, the convex lenses 11 and 13 are dropped into the lens frames 21 and 23. The lens frames 21 and 23 use the retaining surfaces to hold the convex lenses 11 and 13. After centering to be described later, the convex lenses 11 and 13 are adhesively bonded to the inner surface of the cylindrical portion.

When the convex lenses 11 and 13 are bonded to the lens frames 21 and 23, the lens frames 21 and 23 move along the lens frame edges. Due to this moving, optical axes of the convex lenses 11 and 13 move along the lens frame edges. For this reason, the convex lenses 11 and 13 are centered so that their optical axes coaxially are arranged to the center axes of the lens frames 21 and 22. After this centering, the external surfaces of the convex lenses 11 and 13 are adhesively bonded to the inner surfaces of the lens frames 21 and 23.

The concave lens 12 is adhesively bonded to the lens frame 22. The lens frame 22 is formed by processing a lens frame blank 22' as shown in FIG. 3. The lens frame blank 22' has a U-shaped portion 22a for holding a lens. The U-shaped portion 22a has a U-shaped cross-section.

In order to fix the concave lens 12 to the lens frame 22, the concave lens 12 is first dropped into the lens frame blank 22'. Then, the concave lens 12 is centered and is adhesively bonded to the lens frame blank 22'. After the concave lens 12 is fixed, the U-shaped portion 22a is removed from the blank 22' by a cutter 25 (cutting tool, milling cutter, etc.) as shown in FIG. 3. The lens frame 22 is formed in this manner.

The lens frame blank 22' has substantially the same outside diameter as that of the lens frames 21 and 23. Namely, the lens frame blank 22' has substantially the same outside diameter as the dimension (finished dimension) of the lens frame 22 after the processing.

The lens frame blank 22' has an outer periphery. The outer periphery has a center axis. The lens frame blank 22' has a center axis. The center axis of the blank 22' is the center axis Qf the periphery thereof. The lens frame blank 22' has edges 22b and 22c extending in a direction orthogonal to the center axis. The edges 22b and 22c are spaced with a predetermined distance along the center axis. The spaced distance is substantially coincident with a dimension along the center axis of the lens frame 22 after the U-shaped portion 22a is removed from the blank 22'. Namely, the width dimension from the edges 22b to 22c of the lens frame blank 22' is finished to be substantially the same as the finished dimension of lens frame 22.

The lens frame blank 22' has a cylindrical portion. The cylindrical portion has substantially the same inside diameter as the outside diameter of the concave lens 12. Namely, the inside diameter of the cylindrical portion is finished to be the same as the finished dimension. Accordingly, the concave lens 12 can be arranged in the cylindrical portion. The outer surface of the concave lens 12 is in contact with the inner surface 22e. The outer surface of the concave lens 12 is adhesively bonded to an inner surface 22e of the cylindrical portion. Thus, the inner surface 22e of cylindrical portion works as the lens-holding surface for holding the concave lens 12.

The cylindrical portion has a center axis. The center axis coaxially arranged to the center axis of inside periphery thereof. The center axis of the cylindrical portion substantially coaxially arranged to the center axis of the lens frame 22'. The cylindrical portion has one and the other ends in a direction along the center axis of the lens frame blank 22'. One end is positioned to the side of an edge 22c in a direction along the center axis of the lens frame blank 22'. The other end is positioned to the side of an edge 22b in a direction along the center axis of the lens frame blank 22'. Each of the both ends has an opening.

The U-shaped portion 22a is integrally formed with the lens frame blank 22' at edge 22b. Specifically, the U-shaped portion 22a is located near the inner surface 22e of the cylindrical portion in a direction orthogonal to the center axis of the lens frame blank 22'. Namely, the U-shaped portion 22a is located near the opening of the cylindrical portion on the edge 22b. The U-shaped portion 22a projects toward the inside of the cylindrical portion. Further, the U-shaped portion 22a projects toward the inside of the cylindrical portion in a direction along the center axis of the lens frame blank 22'. Namely, the U-shaped portion 22a has a top portion inserted in the cylindrical portion. The tip surface of the top portion is spaced for a predetermined distance from the edge 22b along the center axis of the lens frame blank 22'. Consequently, the U-shaped portion 22a has a surface opposite the inner surface 22e of the cylindrical portion. The U-shaped portion 22a supports the lens by using the tip surface of the top portion and the surface opposite the inner surface 22e. Accordingly, the tip surface of the top portion and the surface opposite the inner surface 22e provide a lens-retaining surface. The lens-retaining surface is represented by the reference numeral 22f in FIG. 3.

The distance from the edge 22c to the retaining surface 22f is determined according to a position for mounting the concave lens 12. Specifically, the distance from the edge 22c to the retaining surface 22f is determined in a direction along the center axis of the cylindrical portion so that the concave lens 12 can be arranged at a predetermined position with reference to the convex lenses 11 and 13. The distance from the edge 22c to the retaining surface 22f is finished to be a dimension so that the concave lens 12 in FIG. 2 can ensure a predetermined clearance between the convex lenses 11 and 13 when the lens frame 22 is mounted in the lens barrel 3 in FIG. 1.

As shown in FIG. 3, the U-shaped portion 22a has a space 22g between a lens-retaining surface 22f and the inner surface 22e. In other words, the space 22g is provided between the inner surface 22e and the top portion of the U-shaped portion 22a. As shown in FIG. 3, the space 22g is provided from the edge 22b toward the edge 22c along the center axis of the cylindrical portion. When the concave lens 12 is held by the lens-retaining surface 22f, the concave lens 12 is separated from the edge 22b due to the space 22g. The space 22g can prevent the concave lens 12 from interfering with the tip of the cutter 25. Accordingly, it is possible to say that the space 22g is formed between the retaining surface 22f and the inner surface 22e in such a degree as to prevent the tip of the cutter 25 from interfering with the concave lens 12.

The lens frame 22 configures the lens assembly by fixing the concave lens 12 as mentioned above. The lens frames 21 and 23 also configure a lens assembly holding the convex lenses 11 and 13. As shown in FIG. 1, these lens assemblies are arranged in the lens barrel 3 and configure the objective unit together with the other members.

According to the embodiment, the lens frame can hold lenses even in the objective unit having an optical system which makes it difficult to hold lenses according to the conventional holding method due to closely arranged lenses. Consequently, the lenses can be highly accurately positioned with reference to the lens frames. In addition, the lenses can be highly accurately centered with reference to the lens frames. Further, each lens can be highly accurately maintained with a predetermined clearance in relation to adjacent lenses. Accordingly, the embodiment can provide a highly accurate objective unit.

Second Embodiment

Figure 4:
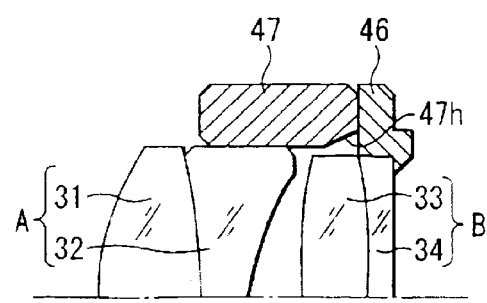
FIG. 4 is a vertical sectional view showing a lens assembly of an objective unit according to a second embodiment.
Figure 5:
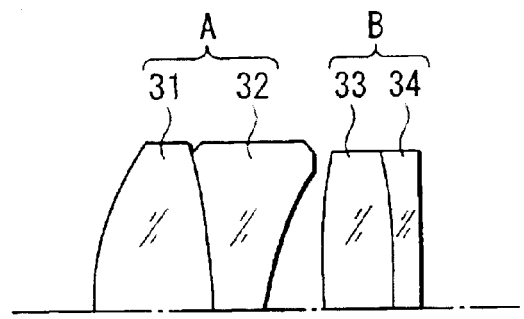
FIG. 5 shows an optical system for the objective unit in FIG. 4.
Figure 6:
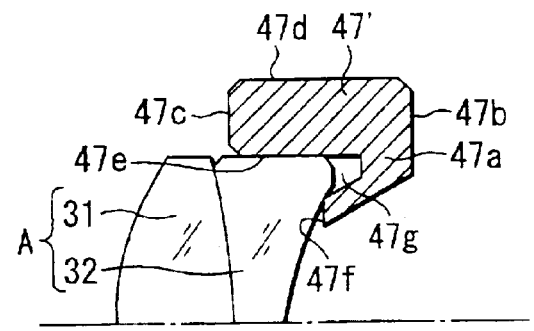
FIG. 6 is a vertical sectional view showing a lens assembly before removing a U-shaped portion according to the second embodiment.
Figure 7:
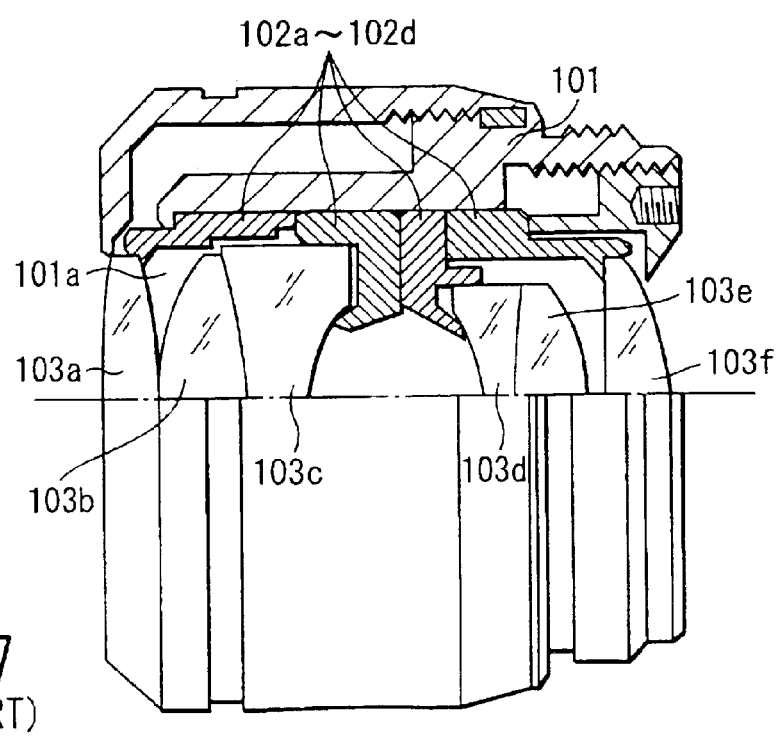
FIG. 7 is a vertical sectional view showing a conventional objective unit.
Figure 8:
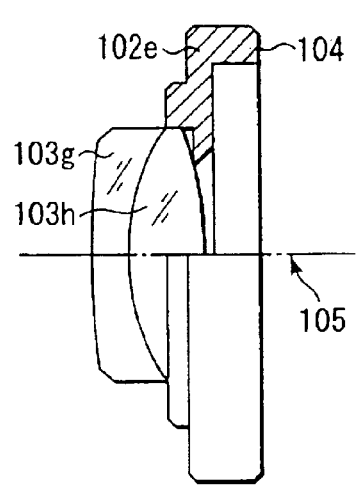
FIG. 8 is a sectional view showing a conventional lens frame holding a cemented lens.
Figure 9:
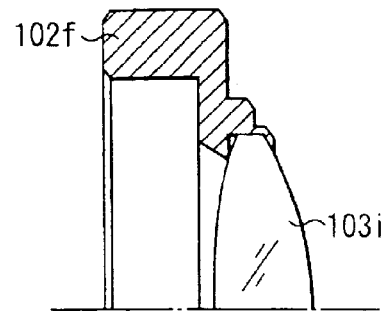
FIG. 9 is a sectional view showing a conventional lens frame holding lenses by means of caulking.

FIGS. 4 through 6 show the second embodiment. FIG. 4 is a vertical sectional view showing a lens assembly of an objective unit. FIG. 5 shows an optical system for the objective unit in FIG. 4. FIG. 6 is a vertical sectional view showing a lens assembly before removing a U-shaped portion.

Figure 10:
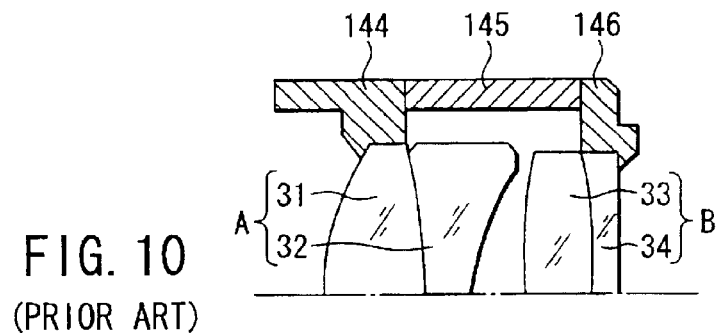
FIG. 10 shows a conventional lens assembly having a clearance ring.
Figure 11:
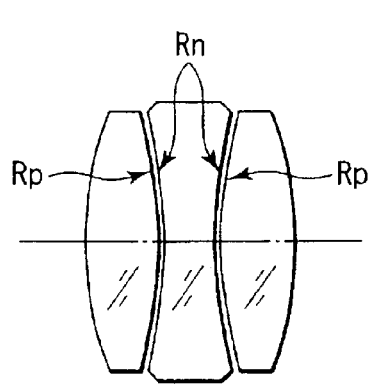
FIG. 11 is a sectional view showing an optical system which is difficultly held by the conventional lens frame.
Figure 12:
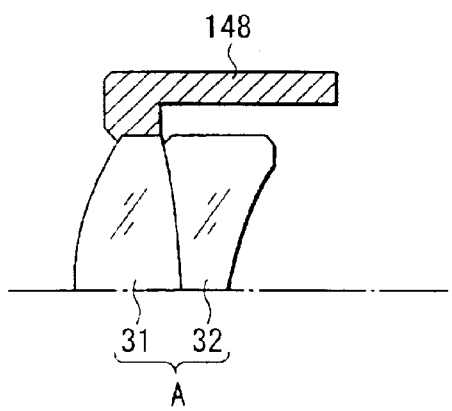
FIG. 12 is a vertical sectional view showing a lens assembly formed by integrating the lens frame and the clearance ring in FIG. 10.

The objective unit in FIG. 4 has two lens assemblies. One lens assembly has a set of lenses A and a lens frame 47 for holding the set of lenses A. The set of lenses A has the convex lens 31 and the concave lens 32. The convex lens 31 and the concave lens 32 are bonded to each other. The convex lens 31 and the concave lens 32 configure a cemented lens. The other lens assembly has a set of lenses B and a lens frame 46 for holding the set of lenses B. FIG. 5 shows the optical system by extracting only the lens portion. The optical system is the same as that comprising the set of lenses A and the set of lenses B according to the above-mentioned prior art shown in FIG. 10. In the embodiment, the lens frame 47 differs from the conventional lens frame. The lens frame 47 is shown in FIG. 4. The other lens assembly having the set of lenses B and the lens frame 46 is the same as the prior art.

As shown in FIG. 4, the set of lenses A is adhesively bonded to the lens frame 47. During the bonding, the set of lenses A is dropped into the lens frame blank 47' as shown in FIG. 6. Like the first embodiment, the lens frame blank 47' is the lens frame 47 before processed. The lens frame blank 47' has a U-shaped portion 47a. The lens frame blank 47' is finished in the same manner as the first embodiment. Specifically, the lens frame blank 47' has the same finished dimensions as the lens frame 47 concerning the width dimension from the edges 47b to 47c, the diameter of an outer surface 47d, and the diameter of an inner surface 47e as the lens holding surface.

The U-shaped portion 47a is projected from the inner surface 47e of the edge 47b. Like the first embodiment, the U-shaped portion 47a has a retaining surface 47f as the lens-retaining surface for the concave lens 32. The U-shaped portion 47a forms a space 47g between the retaining surface 47f and the inner surface 47e in such a degree as to prevent the tip of the cutter 25 (see FIG. 3) from interfering with the concave lens 32.

The distance prom the edge 47c to the retaining surface 47f is determined according to the position of mounting the concave lens 32. Specifically, the distance from the edge 47c to the retaining surface 47f is determined in a direction along the center axis of the cylindrical portion so that the concave lens 32 can be arranged at a predetermined position with reference to the convex lens 33 (see FIGS. 4 and 5). The distance from the edge 47c to the retaining surface 47f is set to be a dimension so that the concave lens 32 can ensure a predetermined clearance against the convex lens 33 when the lens frame 47 is mounted in a lens barrel (not shown). The U-shaped portion 47a is removable. Hence, the lens frame 47, when mounted in the lens barrel, can be arranged at the side of the lens frame 46 with respect to lens 31. When the lens frame 47 is formed relatively long along its center axis, it is possible to easily drop the set of lenses A onto the lens-retaining surface. Accordingly, the lens frame 47 is capable of easily dropping the set of lenses A and providing a relatively long clearance against the lens frame 46.

The set of lenses A is dropped into the lens frame blank 47' and is centered. The set of lenses A is then adhesively bonded to the lens frame blank 47'. The cutter 25 is used to cut and remove the U-shaped portion 47a from the lens frame blank 47'. This removing forms a slope 47h as shown in FIG. 4 on the lens frame 47. The lens frame 47 configures a lens assembly having the set of lenses A. The lens frame 46 also configures a lens assembly holding the set of lenses B. These lens assemblies are arranged in the lens barrel 3 (not shown) and configures the objective unit together with the other members.

In addition to the same effects as for the first embodiment, the second embodiment can provide a clearance between adjacent lens frames without using a clearance ring according to the prior art. Consequently, the embodiment can decrease the number of lens frames and provide an objective unit satisfactory for the accuracy.

The above-mentioned optical unit can provide a lens frame capable of holding a group of adjacent lenses. The optical unit can provide accuracy of the centering, and can appropriately ensure positional relationship between a group of lenses and the lens frame.

According to above-mentioned embodiments, a lens is dropped in the U-shaped portion of the lens frame and then is centered. An adhesive is applied between the lens frame and the lens and is hardened. Then, a cutter is used to cut and remove the U-shaped portion. The small-sized lens frame with the lens is mounted in the lens barrel. Accordingly, the lens frame can hold a group of adjacent lenses. It is possible to provide an optical unit which improves accuracy of the centering and appropriately ensures positional relationship between the group of lenses and the lens frame.

According above-mentioned, when the U-shaped portion is removed from the lens frame blank, the tip of the cutter is stopped at a space provided between the lens holding surface and the lens-retaining surface. Accordingly, it is possible to remove the angled U-shaped portion from the lens frame blank without flawing the lens surface with the cutter.

Third Embodiment

Figure 13:
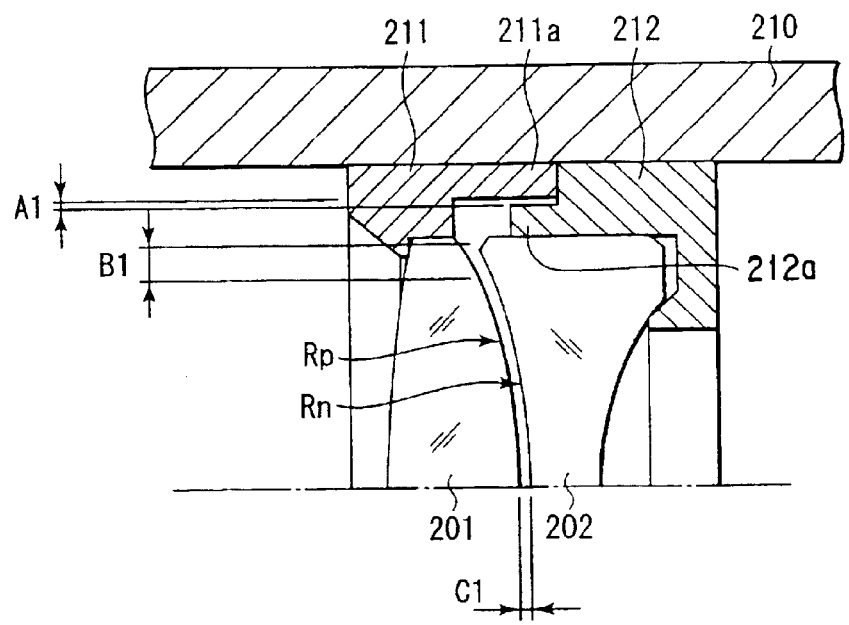
FIG. 13 is a sectional view showing a 2-group configuration lens-holding apparatus according to a third embodiment.
Figure 14:
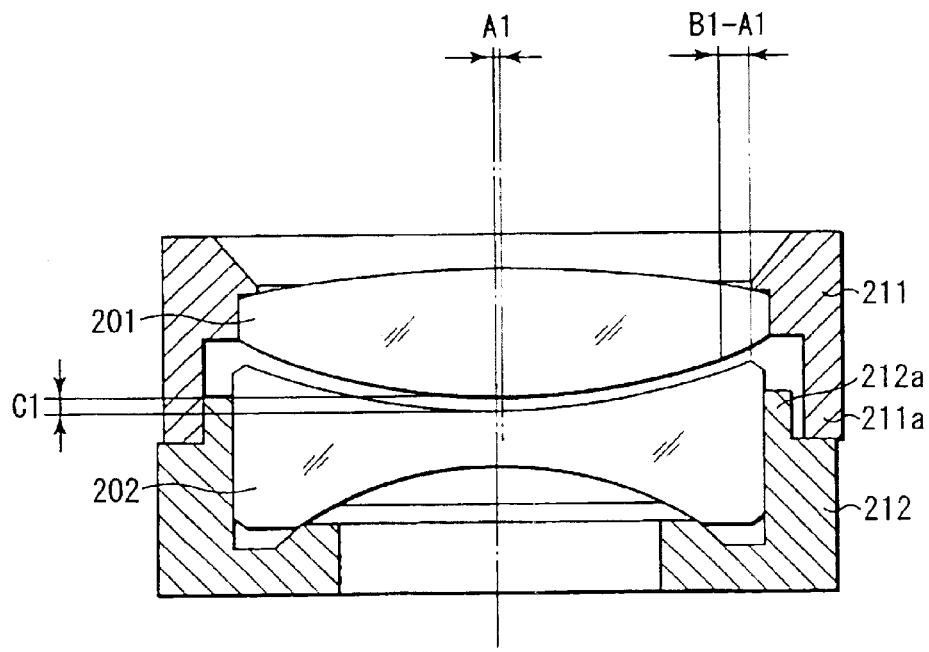
FIG. 14 is an explanatory diagram illustrating the amount of misalignment between a front group lens frame and a rear group lens frame of the lens-holding apparatus according to the third embodiment.

FIG. 13 is a sectional view showing a 2-group configuration lens-holding apparatus. FIG. 14 is an explanatory diagram illustrating the amount of misalignment between a front group lens frame and a rear group lens frame of the lens-holding apparatus.

The lens-holding apparatus in FIG. 13 has a lens barrel 210, a front group lens frame 211 for holding a front group lens 201, and a rear group lens frame 212 for holding a rear group lens 202.

In FIG. 13, the front group lens 201 and the rear group lens 202 have approximate radiuses of curvature for their lens surfaces adjacent to each other. For example, the front group lens 201 has radius of curvature Rp of 10 mm for the surface with the positive power. The rear group lens 202 has radius of curvature Rn of 10.5 mm for the surface with the negative power.

As lens frames for holding the optical system, the front group lens frame 211 and the rear group lens frame 212 have substantially the same outside diameter. The front group lens frame 211 and the rear group lens frame 212 have outer peripheries respectively. Each of the outer peripheries has a center axis. The front group lens frame 211 and the rear group lens frame 212 have center axes. Each of the center axes of the front group lens frame 211 and the rear group lens frame 212 is the center axis of the periphery thereof respectively. The front group lens frame 211 holds the front group lens 201 so that the center axis of the frame substantially is coaxially arranged to the optical axis of the front group lens 201. Likewise, the rear group lens frame 212 holds the rear group lens 202 so that the center axis of the frame substantially coaxially arranged to the optical axis of the rear group lens 202. The front group lens frame 211 and the rear group lens frame 212 are inserted in the lens barrel 210 and are arranged to a predetermined position. When the front group lens frame 211 and the rear group lens frame 212 are arranged to the predetermined position, the center axis of the front group lens frame 211 substantially coaxially arranged to that of the rear group lens frame 212.

When the front group lens frame 211 and the rear group lens frame 212 are arranged to the predetermined position, there is provided a predetermined clearance, i.e., a thrust clearance C1 between the front group lens 201 and the rear group lens 202 along a direction of the optical axes. For example, the thrust clearance C1 is 0.5 mm.

At the predetermined position, the front group lens frame 211 and the rear group lens frame 212 have overlap portions 211a and 212a which overlap with each other along the center axes. In other words, the front group lens frame 211 and the rear group lens frame 212 have the overlapping portions which overlap with each other along the optical axes of the front group lens 1 and the rear group lens 2. The overlap portions 211a and 212a overlap with each other also in the radial direction.

When the front group lens frame 211 and the rear group lens frame 212 are arranged to the predetermined position, the overlap portions are separated from each other by clearance Al in the radial direction. The front group lens 201 and the rear group lens 202 are separated from each other by thrust clearance Cl along the optical axis direction as mentioned above. The front group lens 201 and the rear group lens 202 are separated from each other by clearance B1 in the radial direction. The front group lens frame 211 and the rear group lens frame 212 are configured so that the clearance Al is smaller than the clearance B1.

The following describes actions in the assembling of the lens-holding apparatus according to the above-mentioned configuration. As shown in FIG. 13, the front group lens frame 211 and the rear group lens frame 212 provide the clearance A1 in the radial direction. In this case, before the front group lens frame 211 and the rear group lens frame 212 are mounted in the lens barrel 210, the front group lens frame 211 is movable in the radial direction for a maximum of the clearance A1 with reference to the rear group lens frame 212 as shown in FIG. 14. At the same time, the front group lens frame 211 is prevented from moving beyond the clearance A1 in the radial direction with reference to the rear group lens frame 212. In this case, as shown in FIG. 13, there is an allowance of dimension (=clearance B1−clearance A1) in the radial direction between the front group lens 201 and the rear group lens 202. Accordingly, the lenses do not interfere with each other.

Since the embodiment assumes the radius of curvature Rp=10 (mm), the radius of curvature Rn=10.5 (mm), and the thrust clearance C1=0.5 (mm), Rp/Rn becomes 0.952. As indicated by the above-mentioned values for the radiuses of curvature Rp and Rn, the radius of curvature of the convex lens is smaller than that of the concave lens on the adjacent lens surfaces. The above-mentioned value for Rp/Rn satisfies the condition of 0.58<Rp/Rn<1.65 in claim 7. Generally, adjacent lens surfaces very easily interfere with each other when a value for Rp/Rn ranges from approximately 0.58 to 1.65 as mentioned above. Since the lens holding member according to the embodiment provides the predetermined clearance A1, the adjacent lens surfaces can be prevented against interference with each other.

According to the embodiment, the overlap portion restricts the amount of misalignment in the radial direction between the front group lens frame 211 and the rear group lens frame 212. Accordingly, it is possible to prevent occurrence of a flaw due to interference of adjacent lenses having approximate radiuses of curvature and a small thrust clearance therebetween. The lens-holding apparatus facilitate operations during the manufacturing process.

Fourth Embodiment

Figure 15:
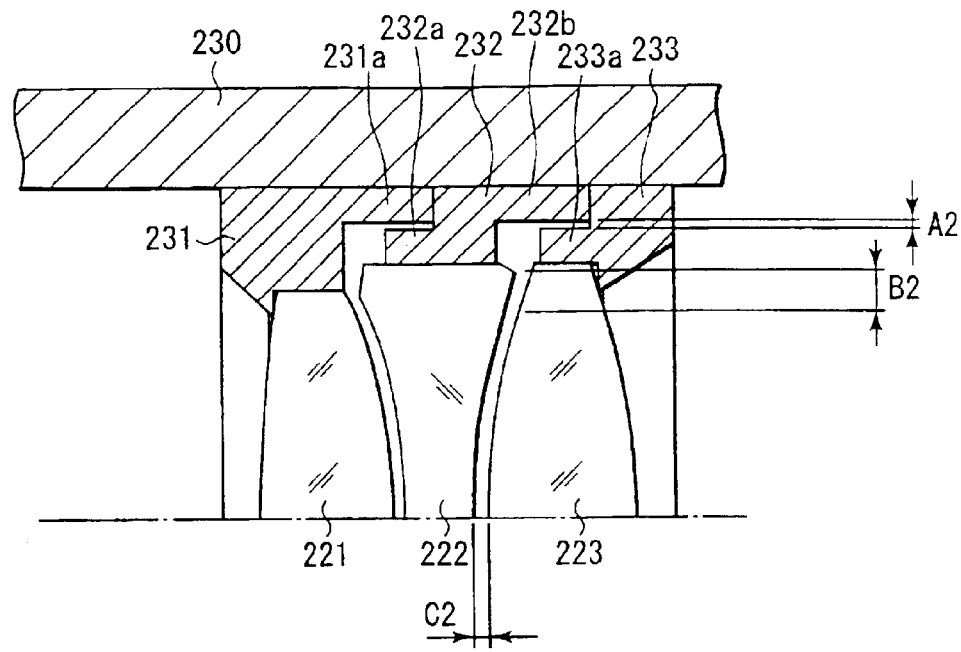
FIG. 15 is a sectional view showing a 3-group configuration lens-holding apparatus according to a fourth embodiment.

FIG. 15 shows the fourth embodiment. FIG. 15 is a sectional view showing a 3-group configuration lens-holding apparatus. The lens-holding apparatus in FIG. 15 has a lens barrel 210, a first group lens frame 231 for holding a first group lens 221, a second group lens frame 232 for holding a second group lens 222, and a third group lens frame 233 for holding a third group lens 223.

The first group lens 221, the second group lens 222, and the third group lens 223 have such radiuses as to approximate radiuses of curvature for the adjacent lens surfaces. As shown in FIG. 15, there is provided a predetermined clearance, i.e., a thrust clearance C2 between the second group lens 222 and the third group lens 223 along their optical axes when these match. The thrust clearance C2 is relatively small.

As lens frames for holding the optical system, the first group lens frame 231, the second group lens frame 232, and the third group lens frame 233 have substantially the same outside diameter. The front group lens frame 211 and the rear group lens frame 212 have outer peripheries respectively. Each of the outer peripheries has a center axis. The front group lens frame 211 and the rear group lens frame 212 have center axes. Each of the center axes of the frame 211, 212 is the center axis of the outer peripheries thereof respectively.

As lens frames for holding the optical system, the first group lens frame 231, the second group lens frame 232, and the third group lens frame 233 are fit into a lens barrel 230. Like the first embodiment, the first group lens frame 231, the second group lens frame 232, and the third group lens frame 233 have overlap portions 231a, 232a, 232b, and 233a which overlap with each other along the center axes. The overlap portions 231a, 232a, 232b, and 233a overlap with each other also in the radial direction.

There is a clearance A2 between the overlap portions 232b and 233a of the second group lens frame 232 and the third group lens frame 233 in the radial direction. Like the first embodiment, there is a thrust clearance C2 between the second group lens 22 and the third group lens 23. The second group lens 22 and the third group lens 23 provide a clearance B2 in the radial direction of the lenses corresponding to the thrust clearance C2. At this time, the clearance A2 between the second group lens frame 232 and the third group lens frame 233 is defined so that A2 becomes smaller than B2.

Since actions in the assembling of the above-mentioned 3-group configuration lens-holding apparatus are the same as those for the third embodiment, a description is omitted.

According to the fourth embodiment, the 3-group configuration can provide the same effects as for the third embodiment. This completely applies to many lens-holding apparatuses comprising four groups or more. It just needs to ensure the above-mentioned structural dimensions for adjacent lens surfaces.

As shown in the first embodiment, the first group lens frame 231, the second group lens frame 232, and the third group lens frame 233 according to the fourth embodiment can be finished after being formed in the lens frame blank in the middle of the process. Accordingly, the first group lens frame 231, the second group lens frame 232, and the third group lens frame 233 according to the embodiment can be assembled in the optical unit like the first embodiment.

Fifth Embodiment

Figure 16:
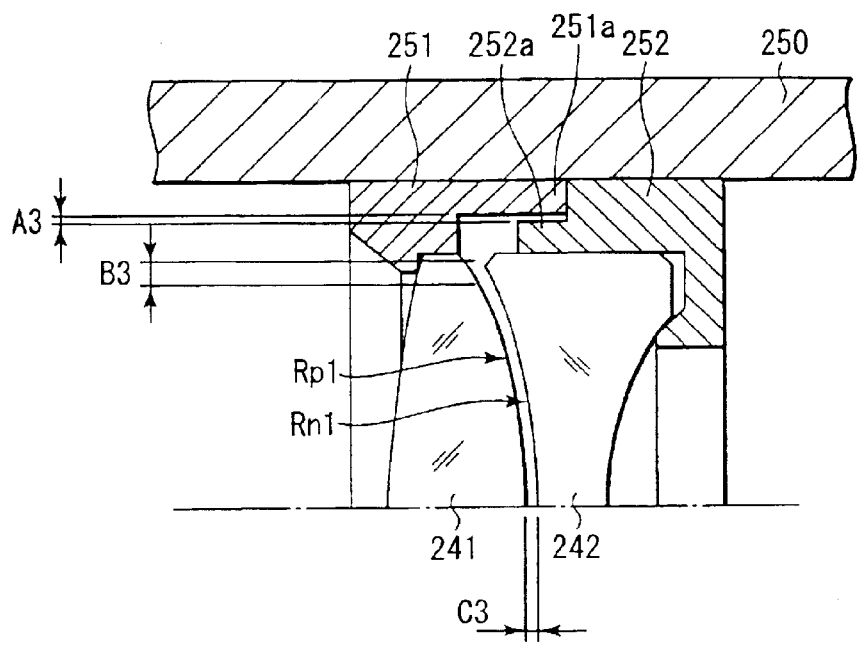
FIG. 16 is a sectional view showing a 2-group configuration lens-holding apparatus according to a fifth embodiment.

FIG. 16 is a sectional view showing a 2-group configuration lens-holding apparatus according to the fifth embodiment. Like the third embodiment, the lens-holding apparatus in FIG. 16 has a lens barrel 250, a front group lens frame 251 for holding a front group lens 241, and a rear group lens frame 252 for holding a front group lens 242. In FIG. 16, the front group lens 241 and the front group lens 242 have approximate radiuses of curvature for their lens surfaces adjacent to each other. For example, the front group lens 241 has radius of curvature Rp1 of 3.0 mm for the surface with the positive power. The front group lens 242 has radius of curvature Rn1 of 4.1 mm for the surface with the negative power.

The lens holding means according to the embodiment is the same as for the third embodiment. When the front group lens frame 251 and the rear group lens frame 252 are arranged to the predetermined position, there is provided a predetermined clearance, i.e., a thrust clearance C3 between the front group lens 241 and the front group lens 242 along the optical axes of themselves. For example, the thrust clearance C3 is 0.5 mm.

At the predetermined position, the front group lens frame 251 and the rear group lens frame 252 according to the embodiment, like the third embodiment, have overlap portions 251a and 252a which overlap with each other along the center axes. In other words, the front group lens frame 251 and the rear group lens frame 252 have the overlapping portions which overlap with each other along the optical axes of the front group lens 241 and the rear group lens 242. The overlap portions 251a and 252a overlap with each other also in the radial direction.

According to the fifth embodiment, like the third embodiment, the overlap portions are separated from each other by clearance A3 in the radial direction. According to the fifth embodiment, like the third embodiment, the front group lens 241 and the front group lens 242 are separated from each other by thrust clearance C3 along the optical axes of themselves as mentioned above. The front group lens 241 and the front group lens 242 are separated from each other by clearance B3 in the radial direction. At this time, the front group lens frame 251 and the rear group lens frame 252 are configured so that the clearance A3 is smaller than the clearance B3.

The following describes actions in the assembling of the lens-holding apparatus according to the above-mentioned configuration. As shown in FIG. 16, the front group lens frame 251 and the rear group lens frame 252 provide the clearance A3 in the radial direction. In this case, before the front group lens frame 251 and the rear group lens frame 252 are mounted in the lens barrel 250, the front group lens frame 251 is movable in the radial direction for a maximum of the clearance A3 with reference to the rear group lens frame 252. At the same time, the front group lens frame 251 is prevented from moving beyond the clearance A3 in the radial direction with reference to the rear group lens frame 252. In this case, as shown in FIG. 13, there is an allowance of dimension (=clearance B3−clearance A3) in the radial direction between the front group lens 241 and the front group lens 242. Accordingly, the lenses do not interfere with each other.

Since the embodiment assumes the radius of curvature Rp1=4.1 (mm), the radius of curvature Rn1=3.0 (mm), and the thrust clearance C3=0.5 (mm), Rp1/Rn1 becomes 1.366. As indicated by the above-mentioned values for the radiuses of curvature Rp1 and Rn1, the radius of curvature of the convex lens is greater than that of the concave lens on the adjacent lens surfaces. A value for Rp1/Rn1 ranges from 0.58 to 1.65. Accordingly, adjacent lens surfaces very easily interfere with each other. More specifically, the value for Rp1/Rn1 indicates a critical value for the upper bound under a condition susceptible to interference of the lenses with each other. Since the lens holding member according to the embodiment provides the predetermined clearance A3, the adjacent lens surfaces can be prevented against interference with each other.

Sixth Embodiment

Figure 17:
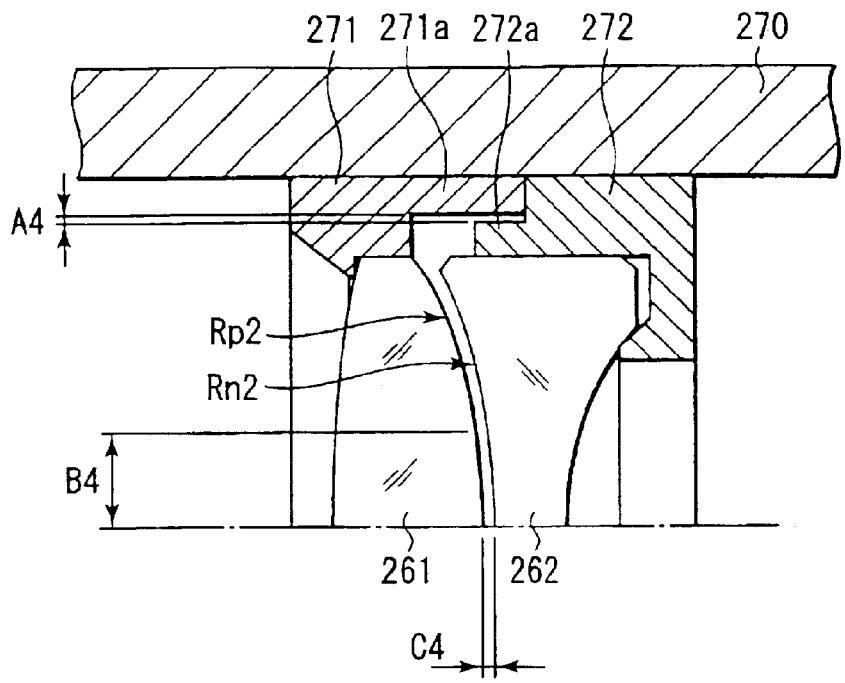
FIG. 17 is a sectional view showing a 2-group configuration lens-holding apparatus according to a sixth embodiment.
Figure 18:
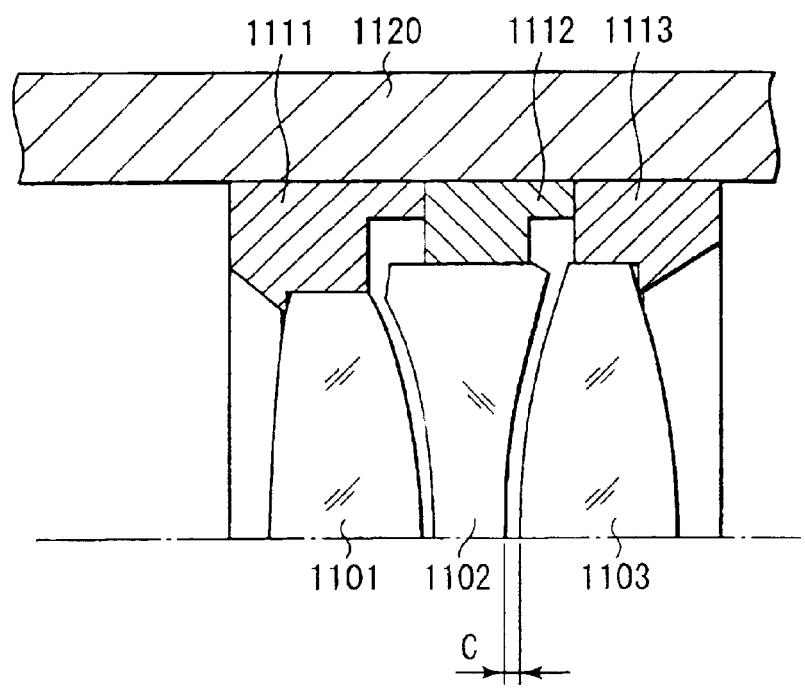
FIG. 18 is a sectional view showing a 3-group configuration lens-holding apparatus according to the prior art.
Figure 19:
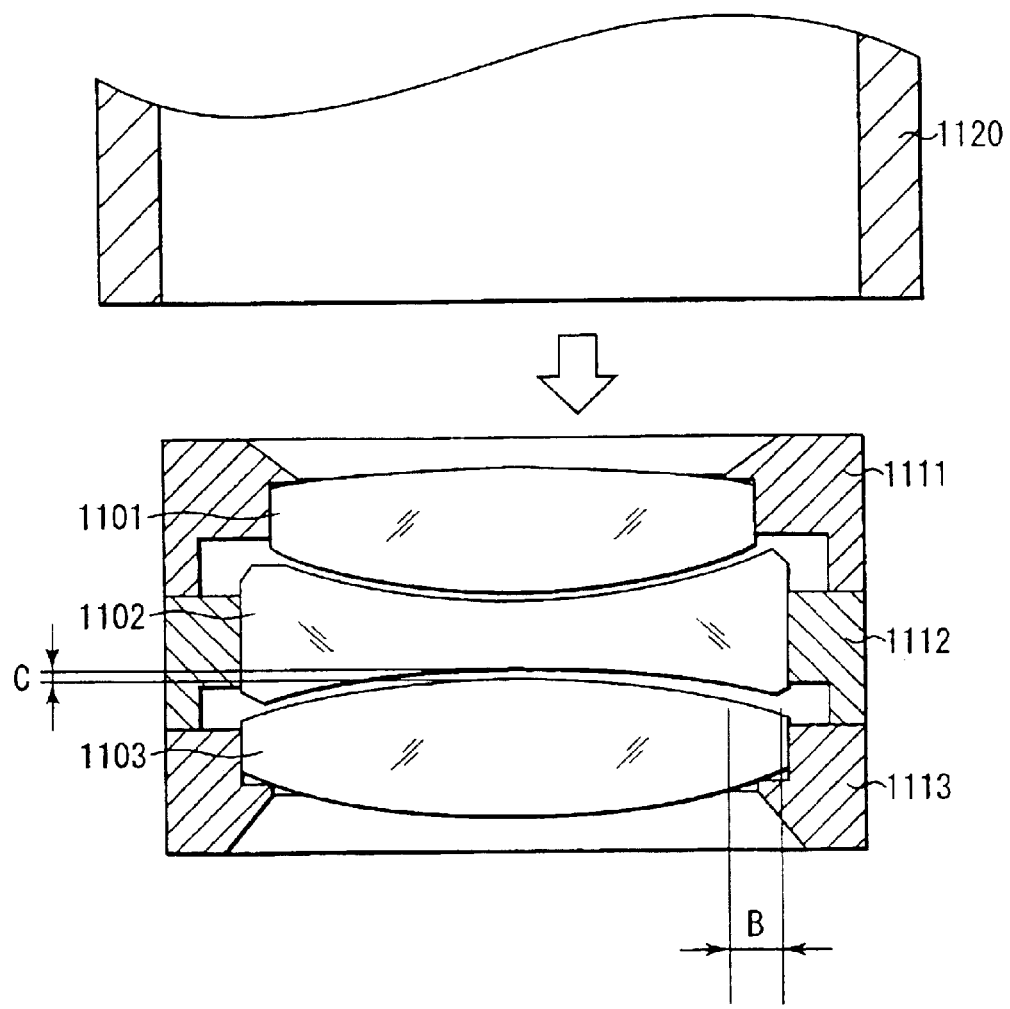
FIG. 19 is an explanatory diagram illustrating an assembling work for 3-group configuration lens-holding apparatus according to the prior art.
Figure 20:
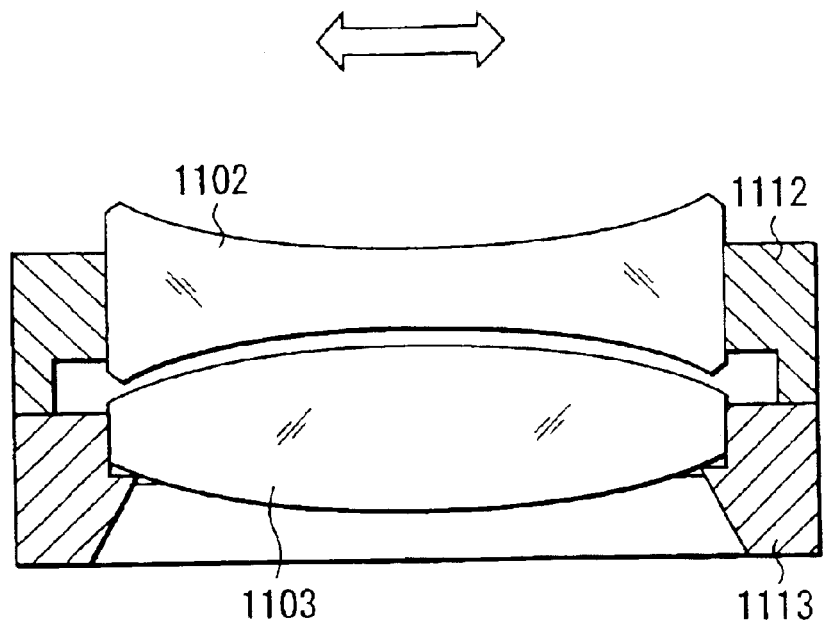
FIG. 20 is an explanatory diagram illustrating a problem of the prior art.
Figure 21:
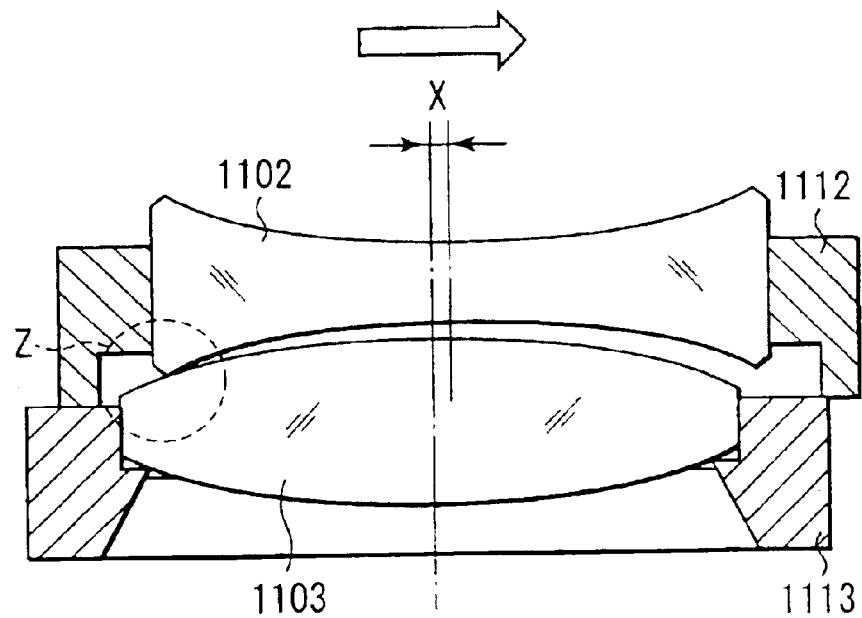
FIG. 21 is an explanatory diagram illustrating a problem of the prior art.

FIG. 17 is a configuration diagram of a 2-group configuration lens-holding apparatus according to a sixth embodiment. Like the third embodiment, the lens-holding apparatus in FIG. 17 has a lens barrel 270, a front group lens frame 271 for holding a front group lens 261, and a rear group lens frame 272 for holding a front group lens 262. In FIG. 17, the front group lens 261 and the front group lens 262 have approximate radiuses of curvature for their lens surfaces adjacent to each other. For example, the front group lens 261 has radius of curvature Rp2 of 7.8 mm for the surface with the positive power. The front group lens 262 has radius of curvature Rn2 of 8.6 mm for the surface with the negative power.

The lens holding means according to the embodiment is the same as for the third embodiment. When the front group lens frame 271 and the rear group lens frame 272 are arranged to the predetermined position, there is provided a predetermined clearance, i.e., a thrust clearance C4 between the front group lens 261 and the front group lens 262 along each optical axis direction. For example, the thrust clearance C4 is 0.1 min.

At the predetermined position, the front group lens frame 271 and the rear group lens frame 272 according to the embodiment, like the third embodiment, have overlap portions 271a and 272a which overlap with each other along the center axes. In other words, the front group lens frame 271 and the rear group lens frame 272 have the overlapping portions which overlap with each other along the optical axes of the front group lens 261 and the rear group lens 262. The overlap portions 271a and 272a overlap with each other in the radial direction.

According to the sixth embodiment, like the third embodiment, the overlap portions are separated from each other by clearance A4 in the radial direction. According to the sixth embodiment, like the third embodiment, the front group lens 261 and the front group lens 262 are separated from each other by thrust clearance C4 along the optical axis direction as mentioned above. The front group lens 261 and the front group lens 262 are separated from each other by clearance B4 in the radial direction. At this time, the front group lens frame 271 and the rear group lens frame 272 are configured so that the clearance A4 is smaller than the clearance B4.

The following describes actions in the assembling of the lens-holding apparatus according to the above-mentioned configuration. As shown in FIG. 17, the front group lens frame 271 and the rear group lens frame 272 provide the clearance A4 in the radial direction. In this case, before the front group lens frame 271 and the rear group lens frame 272 are mounted in the lens barrel 270, the front group lens frame 271 is movable in the radial direction for a maximum of the clearance A4 with reference to the rear group lens frame 272. At the same time, the front group lens frame 271 is prevented from moving beyond the clearance A4 in the radial direction with reference to the rear group lens frame 272. In this case, as shown in FIG. 17, there is an allowance of dimension (=clearance B4−clearance A4) in the radial direction between the front group lens 261 and the front group lens 262. Accordingly, the lenses do not interfere with each other.

Since the embodiment assumes the radius of curvature Rp2=7.8 (mm), the radius of curvature Rn2=8.6 (mm), and the thrust clearance C4=0.1 (mm), Rp2/Rn2 becomes 0.906. As indicated by the above-mentioned values for the radiuses of curvature Rp2 and Rn2, the radius of curvature of the convex lens is smaller than that of the concave lens on the adjacent lens surfaces. A value for Rp2/Rn2 ranges from 0.58 to 1.65. Accordingly, adjacent lens surfaces very easily interfere with each other. More specifically, the value for Rp2/Rn2 indicates a critical value for the lower bound under a condition susceptible to interference of the lenses with each other. Since the lens holding member according to the embodiment provides the predetermined clearance A4, however, the adjacent lens surfaces can be prevented against interference with each other.

The sixth embodiment can provide the same effects as for the third embodiment also to the lens-holding apparatus having the optical system under a condition susceptible to interference of the lenses with each other, wherein the value for Rp2/Rn2 (0.906) indicates a critical value for the lower bound.

With reference to the third and sixth embodiments, there have been described the measures for preventing interference between adjacent lenses having approximate radiuses of curvature and a small thrust clearance. An example of such lens system is a microscope objective lens using wavelengths in a deep ultraviolet range. The microscope objective lens for the deep ultraviolet range uses more lenses than a microscope objective lens using wavelengths in a visible range. The ultraviolet light changes the quality of an adhesive bonding the lenses to each other, causing the possibility of degrading the transmittance. It is desirable not to use a cemented lens. To eliminate the use of a cemented lens, it is necessary to very closely arrange a convex lens and a concave lens having approximate radiuses of curvature. The shared access according to the present invention can be appropriately used for such microscope objective lenses for the deep ultraviolet range.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical unit comprising a plurality of lenses, each of the lenses having a lens surface and an optical axis, and a lens-holding apparatus, the lens-holding apparatus including a plurality of lens frames holding at least one lens respectively, and a lens barrel, the lens frames having portions overlapping with each other in a radial direction orthogonal to the optical axis when the lens frames are arranged adjacent each other along the optical axis, the lens-holding apparatus being provided with a first clearance in the adjacent two lens frames between the overlap portion of one lens frame and the overlap portion of the other lens frame in a radial direction orthogonal to the optical axis, the lens-holding apparatus being provided with a second clearance in the radial direction between the lens surfaces of lenses held by the adjacent two lens frames, the first clearance being smaller than the second clearance, and the lens frames being arranged in the lens barrel.

2. The optical unit according to claim 1, wherein:

the lens-holding apparatus is provided with a third clearance along the optical axis between the lens surfaces of lenses held by the adjacent two lens frames, in the two adjacent lenses, the lens surface of one lens is a positive power, and that of the other lens is a negative power, and when the third clearance is 0.5 mm or less, the following relationship is established:

$$0.58 < Rp/Rn < 1.65,$$

where $Rp$ represents a radius of curvature of the lens surface of the positive power, and $Rn$ represents a radius of curvature of the lens surface of the negative power.

3. The optical unit according to claim 2, wherein the optical unit is a microscope objective lens.

* * * * *